US009856176B2

(12) United States Patent
Harris et al.

(10) Patent No.: US 9,856,176 B2
(45) Date of Patent: Jan. 2, 2018

(54) CERAMIC MATRIX COMPOSITE INCLUDING SILICON CARBIDE FIBERS IN A CERAMIC MATRIX COMPRISING A MAX PHASE COMPOUND

(71) Applicant: Rolls-Royce High Temperature Composites, Inc., Huntington Beach, CA (US)

(72) Inventors: Stephen Harris, Long Beach, CA (US); Robert Shinavski, Mission Viejo, CA (US)

(73) Assignee: Rolls-Royce High Temperature Composites, Inc., Huntington Beach, CA (US)

( * ) Notice: Subject to any disclaimer, the term of this patent is extended or adjusted under 35 U.S.C. 154(b) by 0 days.

(21) Appl. No.: 15/247,167

(22) Filed: Aug. 25, 2016

(65) Prior Publication Data
US 2017/0057879 A1    Mar. 2, 2017

Related U.S. Application Data

(60) Provisional application No. 62/211,326, filed on Aug. 28, 2015.

(51) Int. Cl.
*C04B 35/628*    (2006.01)
*C04B 35/80*    (2006.01)
(Continued)

(52) U.S. Cl.
CPC .......... *C04B 35/803* (2013.01); *C04B 35/565* (2013.01); *C04B 35/5607* (2013.01);
(Continued)

(58) Field of Classification Search
CPC .......... C04B 35/6286; C04B 35/62868; C04B 35/62873; C04B 35/62884;
(Continued)

(56) References Cited

U.S. PATENT DOCUMENTS 6,277,493 B1 *  8/2001  Henager, Jr. .......... C04B 37/005
                                                      428/446
7,645,426 B2    1/2010  Merry
(Continued)

FOREIGN PATENT DOCUMENTS

CA       2849600 A1    10/2007
CN     101269966 A     9/2008
(Continued)

OTHER PUBLICATIONS

Henager. Coatings and joining for SiC and SiC-composites for nuclear energy systems. Journal of Nuclear Materials 367-370 (2007) 1139-1143.*
(Continued)

*Primary Examiner* — Noah Wiese
(74) *Attorney, Agent, or Firm* — Brinks Gilson & Lione

(57) ABSTRACT

A ceramic matrix composite includes continuous silicon carbide fibers in a ceramic matrix comprising silicon carbide and a MAX phase compound having a chemical composition $M_{n+1}AX_n$, where M is a transition metal selected from the group consisting of: Ti, V, Cr, Sc, Zr, Nb, Mo, Hf, and Ta; A is a group-A element selected from the group consisting of: Al, Si, P, S, Ga, Ge, As, Cd, In, Sn, Tl and Pb; and X is carbon or nitrogen, with n being an integer from 1 to 3.

21 Claims, 1 Drawing Sheet

(51) Int. Cl.
- C04B 35/657 (2006.01)
- C04B 35/622 (2006.01)
- C04B 35/56 (2006.01)
- C04B 35/565 (2006.01)
- C04B 35/58 (2006.01)
- F01D 5/28 (2006.01)
- F23R 3/00 (2006.01)

(52) U.S. Cl.
CPC ...... *C04B 35/5615* (2013.01); *C04B 35/5618* (2013.01); *C04B 35/5622* (2013.01); *C04B 35/58007* (2013.01); *C04B 35/58014* (2013.01); *C04B 35/58028* (2013.01); *C04B 35/62277* (2013.01); *C04B 35/62863* (2013.01); *C04B 35/62868* (2013.01); *C04B 35/62873* (2013.01); *C04B 35/62884* (2013.01); *C04B 35/62894* (2013.01); *C04B 35/657* (2013.01); *C04B 35/806* (2013.01); *F01D 5/282* (2013.01); *F01D 5/284* (2013.01); *F23R 3/007* (2013.01); C04B 2235/3826 (2013.01); C04B 2235/3843 (2013.01); C04B 2235/3891 (2013.01); C04B 2235/428 (2013.01); C04B 2235/44 (2013.01); C04B 2235/5244 (2013.01); C04B 2235/5256 (2013.01); C04B 2235/5436 (2013.01); C04B 2235/606 (2013.01); C04B 2235/608 (2013.01); C04B 2235/616 (2013.01); C04B 2235/728 (2013.01); C04B 2235/77 (2013.01); C04B 2235/80 (2013.01); F05D 2240/11 (2013.01); F05D 2300/6033 (2013.01)

(58) Field of Classification Search
CPC ........ C04B 35/62894; C04B 35/62897; C04B 35/80; C04B 35/806; C04B 41/009; C04B 41/5059; C04B 41/87; C04B 35/62863; C04B 41/4531; C04B 41/4572; F01D 11/08; F01D 9/04; F01D 25/246; B23P 15/04
See application file for complete search history.

(56) References Cited

U.S. PATENT DOCUMENTS

| | | | |
|---|---|---|---|
| 7,700,202 B2* | 4/2010 | Easler | C01B 31/36 376/904 |
| 8,863,816 B2 | 10/2014 | Pyzik et al. | |
| 2009/0017332 A1 | 1/2009 | Kisi et al. | |
| 2009/0047510 A1 | 2/2009 | Schuisky et al. | |
| 2010/0009143 A1 | 1/2010 | Pailler et al. | |
| 2010/0055492 A1* | 3/2010 | Barsoum | B22D 19/02 428/613 |
| 2010/0247910 A1 | 9/2010 | Canel et al. | |
| 2011/0170653 A1* | 7/2011 | Cabrero | C04B 35/5611 376/416 |
| 2012/0012403 A1 | 1/2012 | de Rochemont | |
| 2012/0164430 A1* | 6/2012 | Thebault | C04B 35/6286 428/293.4 |
| 2014/0271144 A1* | 9/2014 | Landwehr | F01D 11/08 415/173.1 |
| 2015/0008613 A1 | 1/2015 | Bouillon et al. | |
| 2015/0098546 A1 | 4/2015 | Xu et al. | |

FOREIGN PATENT DOCUMENTS

| | | |
|---|---|---|
| CN | 101508591 A | 8/2009 |
| CN | 104628407 A | 5/2015 |

OTHER PUBLICATIONS

Radovic, M. and Barsoum, M. W., "MAX Phases: Bridging the Gap Between Metals and Ceramics," *American Ceramic Society Bulletin*, 92, 3 (2013) pp. 20-27.

Extended European Search Report for European Application No. 16185085.4, dated Feb. 8, 2017, 8 pages.

* cited by examiner

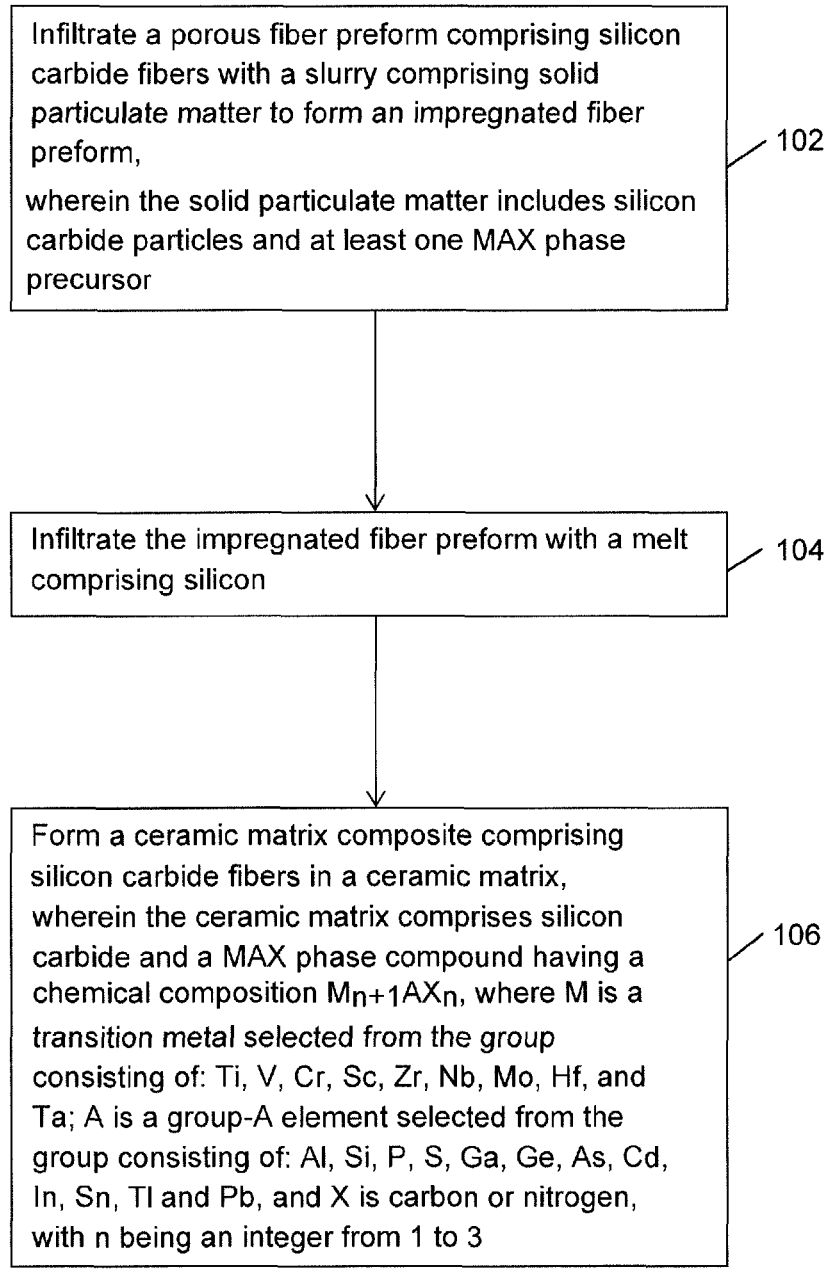

CERAMIC MATRIX COMPOSITE INCLUDING SILICON CARBIDE FIBERS IN A CERAMIC MATRIX COMPRISING A MAX PHASE COMPOUND

RELATE APPLICATION

The present patent document claims the benefit of priority under 35 U.S.C. 119(e) to U.S. Provisional Patent Application No. 62/211,326, filed on Aug. 28, 2015, which is hereby incorporated by reference in its entirety.

TECHNICAL FIELD

The present disclosure is directed generally to ceramic matrix composites and more particularly to silicon carbide fiber-based composites that may have improved fracture toughness and other properties.

BACKGROUND

Ceramic matrix composites, which include ceramic fibers embedded in a ceramic matrix, exhibit a combination of properties that make them promising candidates for industrial and aerospace applications that demand excellent thermal and mechanical properties along with low weight. For example, SiC/SiC composites including SiC fibers in a SiC matrix are being developed for use in gas turbine engines and nuclear applications.

MAX phase compounds are a family of layered hexagonal carbides and nitrides having a chemical composition $M_{n+1}AX_n$, where M is an early transition metal, A is an A-group element usually selected from groups IIIA or IVA of the periodic table, X is either carbon or nitrogen, and n is an integer selected from 1, 2 or 3.

BRIEF SUMMARY

A ceramic matrix composite includes continuous silicon carbide fibers in a ceramic matrix comprising silicon carbide and a MAX phase compound having a chemical composition $M_{n+1}AX_n$, where M is a transition metal selected from the group consisting of: Ti, V, Cr, Sc, Zr, Nb, Mo, Hf, and Ta; A is a group-A element selected from the group consisting of: Al, Si, P, S, Ga, Ge, As, Cd, In, Sn, Tl and Pb; and X is carbon or nitrogen, with n being an integer from 1 to 3.

A method of making a ceramic matrix composite comprises: (a) infiltrating a porous fiber preform comprising coated silicon carbide fibers with a slurry comprising solid particulate matter, where the solid particulate matter includes silicon carbide particles and at least one MAX phase precursor, thereby forming an impregnated fiber preform; (b) infiltrating the impregnated fiber preform with a melt comprising silicon; and (c) forming a ceramic matrix composite comprising silicon carbide fibers in a ceramic matrix, where the ceramic matrix comprises silicon carbide and a MAX phase compound having a chemical composition $M_{n+1}AX_n$, where M is a transition metal selected from the group consisting of: Ti, V, Cr, Sc, Zr, Nb, Mo, Hf, and Ta; A is a group-A element selected from the group consisting of: Al, Si, P, S, Ga, Ge, As, Cd, In, Sn, Tl and Pb; and X is carbon or nitrogen, with n being an integer from 1 to 3.

BRIEF DESCRIPTION OF THE DRAWINGS

FIG. 1 is a flow chart showing exemplary steps in fabricating a ceramic matrix composite.

DETAILED DESCRIPTION

Described herein is a ceramic matrix composite that may exhibit increased fracture toughness, improved machinability, high thermal shock resistance, and/or good thermal and electrical conductivity due to the presence of a MAX phase within the ceramic matrix. MAX phase compounds have been shown to exhibit benefits over typical carbides and nitrides, including improved ductility due to their layered structure. The ceramic matrix composite comprises a framework of silicon carbide fibers in a ceramic matrix comprising silicon carbide and a MAX phase compound.

The MAX phase compound has a chemical composition $M_{n+1}AX_n$, where M is a transition metal selected from among: Ti, V, Cr, Sc, Zr, Nb, Mo, Hf, and Ta, A is a group-A element selected from among: Al, Si, P, S, Ga, Ge, As, Cd, In, Sn, Tl and Pb, and X is carbon or nitrogen, with n being an integer from 1 to 3. The group-A elements come predominantly from Groups IIIA and IVA of the periodic table, and the transition metals are early transition metals from Groups IIIB-VIB. The MAX phase compound may be a carbide or a nitride. The ceramic matrix is not limited to a single MAX phase compound and thus may be understood to include at least one MAX phase compound.

In one example, M is Ti and the MAX phase compound may be selected from among: $Ti_2CdC$, $Ti_2AlC$, $Ti_2GaC$, $Ti_2InC$, $Ti_2TlC$, $Ti_2AlN$, $Ti_2GaN$, $Ti_2InN$, $Ti_2GeC$, $Ti_2SnC$, $Ti_2PbC$, $Ti_2SC$, $Ti_3AlC_2$, $Ti_3SiC_2$, $Ti_3GeC_2$, $Ti_3SnC_2$, $Ti_4AlN_3$, $Ti_4GaC_3$, $Ti_4SiC_3$, and $Ti_4GeC_3$. Preferred MAX phase compounds include $Ti_2AlC$, $Ti_2AlN$, $Ti_3SiC_2$, $Ti_4AlN_3$ and $Ti_4SiC_3$.

In a second example, M is V and the MAX phase compound may be selected from among: $V_2AlC$, $V_2GaC$, $V_2GaN$, $V_2GeC$, $V_2PC$, $V_2AsC$, $V_3AlC_2$, and $V_4AlC_3$.

In a third example, M is Cr and the MAX phase compound may be selected from among: $Cr_2GaC$, $Cr_2GaN$, $Cr_2AlC$, and $Cr_2GeC$.

In a fourth example, M is Sc and the MAX phase compound may comprise $Sc_2InC$.

In a fifth example, M is Zr and the MAX phase compound may be selected from among: $Zr_2InC$, $Zr_2TlC$, $Zr_2InN$, $Zr_2TlN$, $Zr_2SnC$, $Zr_2PbC$, and $Zr_2SC$.

In a sixth example, M is Nb and the MAX phase compound may be selected from among: $Nb_2AlC$, $Nb_2GaC$, $Nb_2InC$, $Nb_2SnC$, $Nb_2PC$, $Nb_2AsC$, $Nb_2SC$, and $Nb_4AlC_3$.

In a seventh example, M is Mo and the MAX phase compound may comprise $Mo_2GaC$.

In an eighth example, M is Hf and the MAX phase compound may be selected from among: $Hf_2InC$, $Hf_2TlC$, $Hf_2SnC$, $Hf_2PbC$, $Hf_2SnN$, and $Hf_2SC$.

In a ninth example, M is Ta and the MAX phase compound may be selected from among: $Ta_2AlC$, $Ta_2GaC$, $Ta_3AlC_2$, and $Ta_4AlC_3$.

Due to the improved fracture toughness, thermal shock resistance and machinability of MAX phase compounds compared to silicon carbide, it is advantageous for the ceramic matrix to include a substantial fraction of the MAX phase. For example, the concentration of the MAX phase compound in the ceramic matrix may be at least about 30 wt. %, at least about 40 wt. %, at least about 50 wt. %, at least about 60 wt. %, at least about 70 wt. %, at least about 80 wt. %, or at least about 90 wt. %. Typically, the MAX phase compound is present at a concentration in the ceramic matrix of no more than 99 wt. %, or no more than 95 wt. %.

The silicon carbide may be present in the ceramic matrix at a concentration of from about 1 wt. % to about 60 wt. %. For example, the concentration of the silicon carbide may be at least about 5 wt. %, at least about 10 wt. %, at least about 20 wt. %, at least about 30 wt. %, at least about 40 wt. %, or at least about 50 wt. %. Typically, the silicon carbide is present in the ceramic matrix at concentration of no more than 60 wt. %, no more than about 50 wt. %, or no more than 40 wt. %.

The ceramic matrix composite described herein may form all or part of a ceramic matrix composite part that may require, among other properties, high fracture toughness and good thermal shock resistance. For example, the ceramic matrix composite may be used as a turbine engine component, such as a blade seal segment, blade, vane, or combustion liner.

FIG. 1 shows exemplary steps in fabricating a ceramic matrix composite that includes a MAX phase compound as part of the ceramic matrix. To form the ceramic matrix composite, a porous fiber preform comprising silicon carbide fibers is infiltrated 102 with a slurry comprising solid particulate matter, including silicon carbide particles and one or more MAX phase precursors. Preferably, the silicon carbide fibers are coated silicon carbide fibers, as described below. An impregnated fiber preform is thus formed. The MAX phase precursor(s) are selected such that, when the impregnated fiber preform is infiltrated 104 with a melt comprising silicon, one or more reactions between the melt and the MAX phase precursor(s) occur and lead to the formation 106 of a MAX phase compound having a composition as described above. The slurry may include additional reactive precursors that can react with the melt during melt infiltration to form silicon carbide. The MAX phase precursor(s) may comprise a compound, an unreacted element, or both. Upon cooling after infiltration, a ceramic matrix composite including silicon carbide fibers in a ceramic matrix that includes at least two ceramic phases, specifically, silicon carbide and the MAX phase compound, is formed.

Preferably, after melt infiltration, the ceramic matrix includes a minimal amount of unreacted silicon, which can negatively affect the properties of the composite. For example, the amount of unreacted silicon in the ceramic matrix may be about 5 wt. % or less, or about 3 wt. % or less. The ceramic matrix may further include additional ceramic phases formed during melt infiltration. For example, the ceramic matrix may include a silicide phase, such as a transition metal silicide selected from among: titanium silicide, vanadium silicide, chromium silicide, scandium silicide, zirconium silicide, niobium silicide, molybdenum silicide, hafnium silicide and tantalum silicide or silicon-group A compounds.

The MAX phase precursor(s) may comprise a transition metal, a group-A element, and/or carbon. More specifically, the MAX phase precursor(s) may include one or more elements selected from among Ti, V, Cr, Sc, Zr, Nb, Mo, Hf, Ta, Al, Si, P, S, Ga, Ge, As, Cd, In, Sn, Tl, Pb and C. As described above, Ti, V, Cr, Sc, Zr, Nb, Mo, Hf and Ta are transition metals, and Al, Si, P, S, Ga, Ge, As, Cd, In, Sn, Tl, Pb may be referred to as group-A elements. In one example, the MAX phase precursor(s) may comprise Ti, C and/or another unreacted element from the above list of elements. In another example, the MAX phase precursor(s) may comprise a carbide, nitride and/or hydride that includes at least one of the elements listed above. Exemplary MAX phase precursor(s) include titanium carbide and titanium hydride.

Generally speaking, suitable carbides for use as MAX phase precursors may include transition metal carbides chosen from among: titanium carbide, vanadium carbide, chromium carbide, scandium carbide, zirconium carbide, niobium carbide, molybdenum carbide, hafnium carbide and tantalum carbide; suitable nitrides may include transition metal nitrides chosen from among: titanium nitride, vanadium nitride, chromium nitride, scandium nitride, zirconium nitride, niobium nitride, molybdenum nitride, hafnium nitride and tantalum nitride; and suitable hydrides may include transition metal hydrides chosen from among: titanium hydride, vanadium hydride, zirconium hydride, niobium hydride, molybdenum hydride, halfnium hydride and tantalum hydride.

Also suitable as MAX phase precursors are group-A carbides chosen from among: aluminum carbide, phosphorus carbide, germanium carbide, arsenic carbide, cadmium carbide, and tin carbide; group-A nitrides chosen from among: aluminum nitride, silicon nitride, phosphorus(V) nitride, sulfur nitride, gallium nitride, germanium nitride, arsenic nitride; cadmium nitride, indium nitride, tin nitride, tellurium nitride and lead nitride; and group-A hydrides chosen from among: aluminum hydride and polysilicon hydride, cadmium hydride, indium hydride and tin hydride.

The melt that is infiltrated into the impregnated fiber preform may comprise pure silicon, which may be referred to as silicon metal, or a silicon alloy that includes one or both of the transition metal and the group-A element. For example, the melt may comprise silicon metal and a transition metal selected from among Ti, V, Cr, Sc, Zr, Nb, Mo, Hf, and Ta, and/or a group-A element selected from among Al, Si, P, S, Ga, Ge, As, Cd, In, Sn, Tl and Pb. The temperature at which melt infiltration is carried out depends on the composition of the melt. In the case of silicon metal, which has a melting temperature ($T_m$) of 1414° C., the temperature may be from about 1410° C. to about 1500° C. Generally speaking, the temperature for melt infiltration is at or above the $T_m$ of the metal or alloy. A melt comprising a silicon alloy at a eutectic composition thereof may be at a temperature less than the melting temperature of silicon metal, which may be beneficial for minimizing degradation during infiltration. Typically, melt infiltration is carried out for a time duration of several minutes to several hours, depending in part on the size and complexity of the component.

Prior to melt infiltration, the impregnated fiber preform may be formed by a slurry infiltration process. A slurry comprising a solvent and the solid particulate matter may be infiltrated into a porous fiber preform assembled from silicon carbide fibers. Prior to introducing the slurry, the porous fiber preform may be exposed to a vacuum, and the vacuum may be removed during infiltration to create a pressure gradient (e.g., about 1 atm) that forces slurry into the preform. The infiltration may be carried out at room temperature (e.g., from about 15° C. to about 25° C.). After infiltration, the impregnated fiber preform may be dried to remove the solvent. Drying may be carried out at room temperature or at an elevated temperature (e.g., from about 40° C. to about 150° C.). Typically, slurry infiltration leads to a loading level of solid particulate matter in the impregnated fiber preform of from about 40 vol. % to about 60 vol. %, with the remainder being porosity.

The solid particulate matter of the slurry, including silicon carbide, one or more MAX phase precursors, and any reactive precursors, may have an average particle size in the range of from about 1 micron to about 25 microns to promote high reactivity during melt infiltration. The desired particle size may in some cases be attained by mechanical milling (e.g., ball milling with SiC media). The solid particulate matter may be obtained from any of a number of commercial sources, such as Sigma Aldrich (St. Louis, Mo.) or Alfa Aesar (Ward Hill, Mass.). The solvent in which the particulate solids are suspended may be an aqueous or organic solvent, such as water, ethanol, methanol, isopropyl alcohol, methyl ethyl ketone, or toluene. The slurry may further include a binder, such as polyethylene glycol, acrylate co-polymers, latex co-polymers, and/or polyvinyl butyral, a dispersant, such as ammonium polyacrylate, polyvinyl butyral, a phosphate ester, polyethylene imine, or BYK® 110 (Byk USA, Wallingford, Conn.), and/or other slurry additives in an amount of about 10 wt. % or less, or about 5 wt. % or less. For example, another slurry additive may be a pre-gellant material, as described in U.S. Patent Application Ser. No. 62/054,765, "Method for Making Ceramic Matrix Composite Articles," which was filed on Sep. 24, 2014 and is hereby incorporated by reference, for the purpose of minimizing slurry loss from the porous fiber preform.

The porous fiber preform may be formed by lay-up of a plurality of woven or unwoven silicon carbide fibers. The silicon carbide fibers are preferably continuous silicon carbide fibers suitable for weaving. Suitable silicon carbide fibers are commercially available from NGS Advanced Fibers (Toyama, Japan), COI Ceramics, Inc. (Magna, Utah), or Ube Industries (Tokyo, Japan), for example. The woven or unwoven ceramic fibers may be coated with an interphase coating (e.g., comprising pyrolytic carbon or boron nitride (BN)) before or after the porous fiber preform is assembled. The interphase coating may serve as an interface between the silicon carbide fibers and the melt during melt infiltration and also as a compliant layer to enhance toughness and crack deflection in the final composite. The porous fiber preform may then be rigidized by applying a ceramic coating thereto using a process such as chemical vapor infiltration. Thus, the silicon carbide fibers of the porous fiber preform may be referred to as coated silicon carbide fibers.

Example 1

A porous fiber preform may be formed by the lay-up of a plurality of two-dimensional woven silicon carbide fiber fabric plies. This preform may then be coated with boron nitride to serve as a crack-deflecting fiber-matrix interphase through chemical vapor infiltration and then rigidized with silicon carbide to protect the coated fiber during subsequent processing steps. The porous fiber preform may then be placed under vacuum to eliminate any entrapped air, and an aqueous slurry consisting of about 15 volume percent silicon carbide, about 5 volume percent titanium hydride, about 35 volume percent titanium carbide and the remainder being water, dispersants, and binders may be introduced until the component is fully submerged. Once submerged the pressure may be returned to ambient to provide a pressure gradient and further reduce any entrapped porosity. The part may then be dried at approximately 80° C. until the slurry has increased in viscosity substantially enough to prevent slurry egress upon part removal, but is still soft enough to facilitate part removal and surface cleaning. The part may then be removed and the surface cleaned to eliminate excess slurry buildup and the part can then be dried at about 150° C. to drive off any remaining moisture. After slurry infiltration, the part may contain about 20% to about 60% residual porosity and may be infiltrated with a molten titanium-silicon alloy containing about 60 weight percent silicon and about 40 weight percent titanium to form a dense composite with less than about 5% residual porosity. The dense composite may include silicon carbide fibers in a ceramic matrix that includes silicon carbide and one or more MAX phase compounds. The MAX phase compound(s) in this example may include $Ti_3SiC_2$ and/or $Ti_4SiC_3$.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. A ceramic matrix composite comprising:
   a ceramic matrix including silicon carbide and a MAX phase compound having a chemical composition $M_{n+1}AX_n$, where
   M is selected from the group consisting of: Ti, V, Cr, Sc, Zr, Nb, Mo, Hf, and Ta,
   A is selected from the group consisting of: Al, Si, P, S, Ga, Ge, As, Cd, In, Sn, Tl and Pb,
   X is carbon or nitrogen, and
   n is an integer from 1 to 3; and
   continuous silicon carbide fibers in the ceramic matrix,
   wherein the MAX phase compound is present in the ceramic matrix at a concentration of at least about 30 wt. %.

2. The ceramic matrix composite of claim 1, wherein the concentration of the MAX phase compound is from about 60 wt. % to about 99 wt. %.

3. The ceramic matrix composite of claim 1, wherein the MAX phase compound is selected from the group consisting of: $Ti_2CdC$, $Sc_2InC$, $Ti_2GaC$, $Ti_2InC$, $Ti_2TlC$, $V_2AlC$, $V_2GaC$, $Cr_2GaC$, $Ti_2AlN$, $Ti_2GaN$, $Ti_2InN$, $V_2GaN$, $Cr_2GaN$, $Ti_2GeC$, $Ti_2SnC$, $Ti_2PbC$, $V_2GeC$, $Cr_2AlC$, $Cr_2GeC$, $V_2PC$, $V_2AsC$, $Ti_2SC$, $Zr_2InC$, $Zr_2TlC$, $Nb_2AlC$, $Nb_2GaC$, $Nb_2InC$, $Mo_2GaC$, $Zr_2InN$, $Zr_2TlN$, $Zr_2SnC$, $Zr_2PbC$, $Nb_2SnC$, $Nb_2PC$, $Nb_2AsC$, $Zr_2SC$, $Nb_2SC$, $Hf_2InC$, $Hf_2TlC$, $Ta_2AlC$, $Ta_2GaC$, $Hf_2SnC$, $Hf_2PbC$, $Hf_2SnN$, $Hf_2SC$, $Ti_3AlC_2$, $V_3AlC_2$, $Ti_3SiC_2$, $Ti_3GeC_2$, $Ti_3SnC_2$, $Ta_3AlC_2$, $Ti_4AlN_3$, $V_4AlC_3$, $Ti_4GaC_3$, $Ti_4SiC_3$, $Ti_4GeC_3$, $Nb_4AlC_3$, and $Ta_4AlC_3$.

4. The ceramic matrix composite of claim 3, wherein the MAX phase compound is selected from the group consisting of: $Ti_2AlC$, $Ti_2AlN$, $Ti_3SiC_2$, $Ti_4AlN_3$ and $Ti_4SiC_3$.

5. The ceramic matrix composite of claim 1, wherein the silicon carbide is present in the ceramic matrix at a concentration of no more than about 60 wt. %.

6. The ceramic matrix composite of claim 5, wherein the concentration of the silicon carbide is from about 1 wt. % to about 40 wt. %.

7. The ceramic matrix composite of claim 1, wherein the ceramic matrix further comprises a silicide.

8. The ceramic matrix composite of claim 7, wherein the silicide is selected from the group consisting of titanium silicide, vanadium silicide, chromium silicide, scandium silicide, zirconium silicide, niobium silicide, molybdenum silicide, hafnium silicide and tantalum silicide.

9. The ceramic matrix composite of claim 1, wherein the ceramic matrix comprises no more than about 5 wt. % unreacted silicon.

10. A ceramic matrix composite (CMC) part comprising at least one component comprising the ceramic matrix composite of claim 1.

11. The CMC part of claim 10, wherein the component is selected from the group consisting of: blade seal segments, blades, vanes, and combustion liners.

12. A method of making a ceramic matrix composite, the method comprising:
    infiltrating a porous fiber preform comprising coated silicon carbide fibers with a slurry comprising solid particulate matter, the solid particulate matter including silicon carbide particles and at least one MAX phase precursor, thereby forming an impregnated fiber preform;
    infiltrating the impregnated fiber preform with a melt comprising silicon; and
    forming a ceramic matrix composite comprising silicon carbide fibers in a ceramic matrix, wherein the ceramic matrix comprises silicon carbide and a MAX phase compound having a chemical composition $M_{n+1}AX_n$, where M is a transition metal selected from the group consisting of: Ti, V, Cr, Sc, Zr, Nb, Mo, Hf, and Ta; A is a group-A element selected from the group consisting of: Al, Si, P, S, Ga, Ge, As, Cd, In, Sn, Tl and Pb, and X is carbon or nitrogen, with n being an integer from 1 to 3.

13. The method of claim 12, wherein the melt comprises a silicon alloy.

14. The method of claim 13, wherein the melt further comprises the transition metal.

15. The method of claim 14, wherein the melt further comprises the group-A element.

16. The method of claim 13, wherein the melt comprises the silicon alloy at a eutectic composition thereof.

17. The method of claim 13, wherein the melt is at a temperature less than a melting temperature of silicon.

18. The method of claim 12, wherein the at least one MAX phase precursor comprises a carbide, nitride or hydride comprising the transition metal.

19. The method of claim 12, wherein the at least one MAX phase precursor comprises a carbide, nitride or hydride comprising the group-A element.

20. A ceramic matrix composite comprising:
    a ceramic matrix including silicon carbide, a silicide, and
        a MAX phase compound having a chemical composition $M_{n+1}AX_n$, where
        M is selected from the group consisting of: Ti, V, Cr, Sc, Zr, Nb, Mo, Hf, and Ta,
        A is selected from the group consisting of: Al, Si, P, S, Ga, Ge, As, Cd, In, Sn, Tl and Pb,
        X is carbon or nitrogen, and
        n is an integer from 1 to 3; and
    continuous silicon carbide fibers in the ceramic matrix.

21. The ceramic matrix composite of claim 20, wherein the silicide is selected from the group consisting of titanium silicide, vanadium silicide, chromium silicide, scandium silicide, zirconium silicide, niobium silicide, molybdenum silicide, hafnium silicide and tantalum silicide.

* * * * *